United States Patent [19]

Velenyi et al.

[11] Patent Number: 4,676,972
[45] Date of Patent: Jun. 30, 1987

[54] PROCESS FOR THE CONVERSION OF ALCOHOLS TO GASEOUS PRODUCTS

[75] Inventors: Louis J. Velenyi, Lyndhurst; Terry J. Mazanec, Solon, both of Ohio

[73] Assignee: The Standard Oil Company, Cleveland, Ohio

[21] Appl. No.: 759,777

[22] Filed: Jul. 29, 1985

[51] Int. Cl.$^4$ ................................................ C01B 1/13
[52] U.S. Cl. ........................... 423/648 R; 423/415 A; 502/303; 502/304; 502/318; 502/324; 502/331; 502/342; 502/346
[58] Field of Search ................ 423/656, 648 R, 415 A

[56] References Cited

U.S. PATENT DOCUMENTS

| | | | |
|---|---|---|---|
| 4,086,877 | 5/1978 | Henkel et al. | 123/1 A |
| 4,088,450 | 5/1978 | Kosaka et al. | 23/288 |
| 4,091,086 | 5/1978 | Hindin et al. | 423/656 |
| 4,110,256 | 8/1978 | Takeuchi et al. | 252/465 |
| 4,175,115 | 11/1979 | Ball et al. | 423/415 A |
| 4,407,238 | 10/1983 | Yoon | 123/3 |

OTHER PUBLICATIONS

"The Catalytic Decomposition of Methanol into Synthesis Gas for Use as an Automotive Fuel" by S. W. Cowley and Steven C. Gebhard, published in the Colorado School of Mines Quarterly, vol. 78 (1983).

*Primary Examiner*—John Doll
*Assistant Examiner*—Wayne A. Langel
*Attorney, Agent, or Firm*—Larry W. Evans; David J. Untener; Raymond F. Keller

[57] ABSTRACT

An alcohol such as methanol is decomposed to form hydrogen and carbon monoxide at elevated temperature in the presence of mixed metal oxide catalyst containing copper and a metal L selected from the group consisting of Th, Be, Zr, Ce, Mg and U.

The catalyst can contain a further metal M selected from the group consisting of Ca, Mo, Mn, Pt, Ce, Cr, Zn, Al, Ti, La, V, U, Ru, Re and Pd.

The catalysts are particularly effective at relatively low temperatures for example 200°-200° C.

11 Claims, No Drawings

PROCESS FOR THE CONVERSION OF ALCOHOLS TO GASEOUS PRODUCTS

BACKGROUND OF THE INVENTION

1. Field of the Invention

This invention relates to a process for decomposing alcohols to gaseous products, more particularly, to a process for converting an alcohol into hydrogen and carbon monoxide in the presence of a mixed metal oxide catalyst.

2. Description of the Art

Alcohols, and particularly methanol, have been proposed for several years as an alternative fuel source to conventional fuels such as gasoline. It has further been proposed that the methanol should be catalytically decomposed into hydrogen and carbon monoxide and that these two gases should be used as the fuel in an engine. For, example. S. W. Cowley and S. C. Gebhard of The Colorado School of Mines Quarterly Vol. 78 describe this concept and report the use of various methanol synthesis catalysts for the methanol decomposition. Further, *Decomposing Methanol as a Consumable Hydride for Automobiles and Gas Turbines* by Joseph G. Feingold. et al., also describes the decomposition of methanol over as catalysts platinum, palladium, copper. or zinc. In this proposal, both the hydrogen and carbon monoxide can be combusted to provide energy for conventional combustion or turbine engines.

In another previous proposal, U.S. Pat. No. 4,091,086 describes a process for the steam reforming of methanol to produce hydrogen by contacting the reactants with a catalyst containing oxides of zinc, copper and up to 10 percent by weight of thorium. Steam reforming, it be noted, is a reaction in which methanol reacts with water in the form of steam to form hydrogen, carbon dioxide, carbon monoxide and water vapor. The present invention is directed to a process in which methanol is decomposed to form hydrogen and carbon monoxide.

Another previous proposal is U.S. Pat. No. 4,110,256 which describes the use of a catalyst containing oxides of the metals copper, nickel and chromium on an alumina support to decompose alcohols to hydrogen and carbon monoxide and a further proposal is U.S. Pat. No. 4,407.238 which describes a process for the dissociation of methanol to form hydrogen using a catalyst containing manganese, copper and chromium.

It is an object of this invention to provide a catalyst for the decomposition of alcohols which is of higher activity than the previously proposed catalysts, particularly at relatively low temperatures, for example about 200° C., this being a temperature to which the catalyst can be conveniently heated electrically when cold starting.

SUMMARY OF THE INVENTION

According to the present invention a process for the decomposition of an alcohol comprises decomposing the alcohol at elevated temperature in the presence of mixed metal oxide catalyst containing copper and a metal L selected from the group consisting of Th, Be, Zr, Ce, Mg and U.

The catalyst may contain a further metal M selected from the group consisting of Ca, Mo, Mn, Pt, Ce, Zr, Al, Ti, La, V, U, Ru, Re and Pd.

The above defined class of catalysts of the present invention is significantly more active at temperatures around 200° C. than the catalysts such as copper-chromium-zinc and copper-zinc which have been previously described for the decomposition of methanol. This represents an important technical advantage for the reason explained above. The catalyst is preferably of the formula:

$$Cu_a L M_b A_c O_x$$

where L is one or more of the metals selected from the group consisting of Th, Be, Zr, Ce, Mg and U; M is one or more of the metals selected from the group consisting of Ca, Mo, Rh, Mn, Pt, Ce, Cr, Zn, Al, Ti, La, V, U, Ru, Re and Pd; A is an alkali metal and wherein a is 0.5 to 2.5, b is 0.005 to 1.0; c is 0 to 2.0 and x is a number such that the valence requirements of the other elements for oxygen are satisfied.

In stating that the valence requirements of the other elements for oxygen are satisfied or that the catalyst is a mixed metal oxide, we do not intend to exclude catalysts where one of the other elements, for example copper, is present in an elemental or zerovalent state, provided there is some chemically bound oxygen in the catalyst. Further since, in the above formula L can be Ce or U, and M can also be Ce or U; and since the presence of metal A is optional, the above formula includes within its scope binary metal combinations of copper with cerium or copper with uranium. In all other cases it will be apparent that the above formula requires the presence of at least two metals in addition to the copper. Further, the above formula is not intended to be limited to catalysts containing only the elements specified above for L and M and A in combination with copper, but includes the optional presence of other elements in addition to those specified.

DETAILED DESCRIPTION OF THE INVENTION

Reactants

The alcohols useful in the process of the present invention are generally low molecular weight alcohols or mixtures thereof although small amounts of high molecular weight alcohols can also be present without significant deleterious effect. Low molecular weight alcohols as used herein have 1 to 6 carbon atoms and can be saturated or unsaturated and monohydric or polyhydric. The monohydric alcohols can be either branched or straight-chained and include but are not limited to methanol, ethanol, 1-propanol, 2-propanol, 1-butanol, 2-methanol-1-propanol. 1-pentanol and the like. The polyhydric alcohols contain 2 or more OH groups and can also be saturated or unsaturated and branched or straight-chained. Illustrative polyhydric alcohols include but are not limited to 1,2-ethanediol (ethylene glycol), 1,1-ethanediol, 1,2-propanediol (propylene glycol), 1,4-butanediol, 2,3-butanediol, 2 butene-1,4-diol and the like.

Preferably, the low molecular weight alcohols used herein are saturated monohydric alcohols having 1 to 6 carbon atoms or mixtures thereof, methanol and ethanol being most preferred.

Water may be present in amounts that arise from the use of ordinary commercially available alcohols. Additional water may be present but in this case the amount will be less than the stoichiometric amount required for the steam reforming of methanol.

Diluents in the feed can include nitrogen, carbon dioxide, methane or inert gases.

Preferably, the low molecular weight alcohols will be substantially free of sulfur and halogen-containing compounds since these are known poisons for copper-containing catalysts.

Process Conditions

Both batch and continuous type processes can be employed. Further, the process can be conducted in either a fixed-bed or fluid-bed mode although the catalyst is particularly suited for use in a fixed-bed process.

The process conditions for the decomposition of alcohols may vary widely. The temperature should conveniently be from about 100° C. to 500° C., preferably from 150° C. to 300° C., more preferably from 175° C. to 225° C. The pressure can conveniently be from 0.1 to 200 psig, however, low pressures, for example from about 0.5 to about 3 atmospheres, are generally preferred. The contact time can range from 0.1 to 100 seconds.

Catalyst

Conveniently the catalyst of formula $Cu_a L M_b A_c O_x$ contains thorium, i.e., L in the above formula is thorium or is a mixture of metals one of which is thorium.

The thorium-containing catalysts used in the process of the present invention can be those described in U.S. Pat. No. 4,298,354 which discloses mixed oxides of copper and thorium together with other metals and their use in the production of methanol and other alcohols from mixtures of hydrogen and carbon monoxide. In particular, U.S. Pat. No. 4,298,354 describes catalysts of formula: $Cu_a Th M_b A_c O_x$, wherein M is one or more of Ca, Mo, Rh, Mn, Pt. Ce, Cr, Zn, Al, Ti, La, V, U, Ru, Re or Pd, preferably Cr, Zn, Al, Ti, La, V or Pd;

A is an alkali metal, preferably Na; and wherein a is 0.5 to 2.5, preferably 1.3 to 1.7;

b is 0.01 to 1.0, preferably 0.01 to 0.6;

c is 0.05 to 0.9, preferably 0.225 to 0.55; and x is a number such that the valence requirements of the other elements for oxygen is satisfied.

These catalysts can be prepared by a procedure involving adding an alkali metal carbonate to an aqueous solution containing decomposable salts of thorium, copper and the "M" element, to form a precipitate neutralizing the mixture, drying the precipitate and thereafter calcining and then reducing the precipitate.

The preparation of catalysts when the metal L is other than thorium, for example zirconium can be effected in an analogous manner. For example, to prepare a catalyst containing the metals Cu, Zr, Mn and Pd an aqueous solution containing the four metals is prepared and an alkali metal carbonate added to form a coprecipitate of the four metals. This technique is described in our copending U.S. patent application Ser. No. 653,946 filed on Sept. 21, 1984, the disclosure of which is incorporated herein by reference.

The technique described in U.S. Pat. No. 4,298,354 involves precipitation from an aqueous solution and while this is generally very satisfactory for most metals it has been found that certain uranium compounds have a high solubility in water. even at pH values above 9, and uranium is for this reason not always easily precipitated with the other metals.

It is therefore preferred, at least in the case when L is U. to precipitate the metals from a polar organic solvent.

The polar organic solvent can be a ketone such as acetone, an ester such as methyl acetate, an ether such as tetrahydrofuran or an alcohol such as ethanol.

The precipitation of the metals from the solution in the polar organic solvent is conveniently effected by mixing the solution with a solution of the precipitating agent also in a polar organic solvent.

The term polar organic solvent as used herein is intended to mean a solvent containing at least 50 percent by volume of a polar organic solvent. Water can be present but desirably comprises less than 40 percent by volume of the total and preferably less than 10 percent. Preferably, the solvent consists essentially of the polar organic solvent which is preferably an alcohol or mixture of alcohols.

Preferred alcohols are $C_1$ to $C_{10}$ alcohols such as methanol, ethanol, n propanol, i-propanol, n butanol, i butanol, t-butanol, pentanols, hexanols, ethylene glycol, propylene glycol, glycerol or a mixture of these. Methanol is preferred. Small amounts of esters, ethers, alkenes, aromatics, or other solvents can also be present.

The metal compounds dissolved in the polar organic solvent can conveniently be salts such as nitrates, sulfates, halides, phosphates, acetates, other carboxylates or the like. Nitrates are preferred.

The precipitating agent can be a base such as an alkali or alkaline earth metal or ammonium hydroxide, carbonate or bicarbonate or mixture thereof.

The temperature at which the precipitation is effected can vary widely but is conveniently from 10° to about 40° C. The order of addition is not critical.

The calcination is effected to decompose any thermally decomposable compounds especially salts to form the oxide and comprises heating in air to, for example, 250° to 750° C., preferably 300° to 450° C. for a sufficient period of time to decompose the compounds and form the oxides. Usually the duration of the calcination is from 1 to 6 hours.

Where an anion or anions other than oxide remains in the calcined solids then the calcined solids are treated to remove the anion prior to the use of the catalyst since the presence of anions tends to reduce the activity of the catalyst. The nature of the anion will depend on the metal salts from which the catalyst was precipitated since the source of the anion is the counterion of the metal in the salt used and may be, for example, chloride, nitrate, acetate or phosphate and the like.

The removal of these ions, for example chloride, nitrate, acetate and phosphate is conveniently effected by washing with water or other suitable solvent.

Alternatively, the anions may, in suitable cases, be removed by gentle reduction, for example, nitrate and acetate can be removed by gently heating in a stream of a reducing gas such as carbon monoxide or hydrogen. The reduction conditions should be mild in order to avoid an exothermic reaction resulting in the catalyst forming a fused and inactive mass.

The washed catalyst can be impregnated with an aqueous solution of an alkali or alkaline earth metal ions for example, lithium, sodium, potassium, rubidium, cesium, beryllium, magnesium, calcium, strontium or barium to increase the loading of metal A. Suitable compounds for dissolving in water to effect the impregnation are hydroxides, carbonates or bicarbonates. Conveniently up to 10 percent by weight of additional metal A may be added by impregnation.

Preferably the catalyst is formed into pellets by incorporation of a binding agent and pressing in a pellet press. Suitable binding agents include graphite, titanium dioxide, thorium dioxide, alumina, or zirconium dioxide. These agents may be used as a colloidal dispersion. Conveniently 1 to 10 percent, preferably 3 to 5 percent of graphite is useful as a binding agent.

In the present invention, the presence of alkali metal in the catalyst is optional, i.e., c can be zero. These catalysts can be prepared by replacing the alkali metal carbonate in the above procedure with ammonium hydroxide, ammonium carbonate or ammonium bicarbonate. Catalysts prepared in this way are referred to as substantially alkali metal-free. This term is intended to include catalysts which contain alkali metal in the amounts that would arise from alkali metal as an impurity in normally commercially available materials.

Although the catalyst of the present invention is used in a reducing atmosphere, it is preferable to reduce the calcined precipitate prior to use in the inventive process. Prereduction of the catalyst, however, is not necessary, since the catalyst will automatically undergo reduction to an equilibrium value in use, although the activity of the catalyst may not be as great as when a prereduction procedure is carried out. In this regard, it is believed that heating of the calcined precipitate to higher temperatures will cause significant reduction in the activity of the ultimate catalyst produced due to sintering of particles of the calcined precipitate. Since a very exothermic reaction may occur when a reducing gas is contacted with the calcined precipitate, it is preferable to subject the calcined precipitate to a controlled reduction procedure in order to avoid over heating. Therefore, it is preferable to carry out a controlled reduction of the calcined precipitate, for example, by heating the calcined precipitate in a stream of a hydrogen-containing gas such as a hydrogen-nitrogen mixture or hydrogen-carbon monoxide mixture. Conveniently the temperature is raised in a stepwise fashion to about 250° C. and the duration of the reduction can be up to 3 hours or more.

The catalysts of the present invention can be used alone or supported on various inert supports such as silica, alpha-alumina, Alundum, mullite and the like. These materials can be added to the catalyst during its preparation (i.e. after the precipitate is first formed) or after the preparation of the catalyst in conventional manner by, for example, coating on the support.

The invention is illustrated by the following Examples and comparative experiments.

PREPARATION A

(I) Preparation of Copper-Thorium Catalyst

A catalyst containing oxides of copper, thorium, palladium and potassium was prepared as follows:

120.97 g of Cu(NO₃)₂, molecular weight 241.6, 0.501 mol, together with 183.72 g of Th(NO₃)₄, molecular weight 552.1, 0.333 mol and 4.29 g of Pd(NO₃)₂, 41.63 percent, 0.0168 mol were combined in 3.2 liters of water and heated to about 90° C. The mixture was neutralized by addition of a solution of potassium carbonate in water at 90° C. (150 g in 500 ml water) over the course of one hour. When the pH reached 9.5, the addition was stopped and the black mixture heated for an hour at 90° C. The solution was neutralized with dilute nitric acid to a pH of 7 and filtered. The filter cake was slurried in water and refiltered. This was repeated twice. The solid was dried at 130° C. for 2 hours then calcined in air at 400° C. for 4 hours. The percent of weight of the various metal components based on the weight of the total catalyst and support were:

Cu: 22 percent
Th: 52 percent
Pd: 1.2 percent
K: 3.7 percent corresponding to the formula:

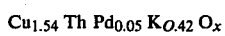

$Cu_{1.54} Th Pd_{0.05} K_{0.42} O_x$

(II) Reduction/Activation of Catalyst

The catalyst was then reduced by passing 9.1 percent hydrogen in nitrogen over the catalyst at a rate of 165 cc/minute of gas mixture. The temperature was raised stepwise, holding for 10 minutes at 100° C., 150° C. and 200° C. After reaching 250° C., the reduction continued for one hour.

EXAMPLES 1 AND 2

The reduced catalyst from Preparation A was then employed for the vapor phase decomposition of a feed consisting of methanol. The reaction conditions and percent conversions are recorded in the Table. The percent conversion is defined as -

$$\frac{(\text{Amount of methanol fed} - \text{amount of methanol recovered})}{\text{amount of methanol fed}} \times \frac{100}{1}$$

PREPARATION B

(I) Preparation of Alkali Metal-free Catalyst

A catalyst containing oxides of copper, thorium and palladium was prepared by the procedure described in Preparation A except that ammonium hydroxide was used to precipitate the metals from the mixed nitrates solution instead of potassium carbonate.

The percent by weight of the various metal components based on the total weight of the catalyst were:

Cu: 21 percent
Th: 61 percent
Pd: 0.26 percent
K: less than 0.005 percent corresponding to a formula of:

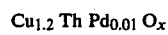

$Cu_{1.2} Th Pd_{0.01} O_x$

(II) Activation/Reduction

The catalyst was reduced as described above in Preparation A.

EXAMPLES 3 AND 4

The reduced catalyst from Preparation B was employed for the vapor phase decomposition of methanol. The reaction conditions and percent conversion are recorded in Table 1.

EXPERIMENT 1

A catalyst containing oxides of copper and zinc as described in U.S. Pat. No. 4.407.238 was obtained commercially from United Catalysts Incorporated designated Catalyst No. G66B.

The percent by weight of the various metal components based on the total weight of the catalyst were:

Cu: 26 percent
Zn: 52 percent

The catalyst was reduced as described in preparation A and then employed for the vapor phase decomposition of methanol. The reaction conditions and conversion are recorded in Table 2.

EXPERIMENTS 2 AND 3

A catalyst containing oxides of copper, chromium and zinc as described in U.S. Pat. No. 4,407,238 was obtained commercially from United Catalyst Incorporated designated Catalyst No. G89.

The percent by weight of the various metal components based on the total weight of catalyst were:
Cu: 39 percent
Mn: 3 percent
Cr: 37 percent The catalyst was reduced exactly as described above and then employed for the vapor phase decomposition of methanol.

The results are recorded in Table 2.

PREPARATION C

(I) Preparation of Copper-Uranium Catalyst

A catalyst with the formula $Cu_{1.38}$ U $Al_{0.2}$ $K_{1.0}$ $O_x$ was prepared as follows: 100.0 g of $Cu(NO_3)_2 \cdot 2\frac{1}{2}H_2O$, 144.0 g of $UO_2(NO_3)_2 \cdot 6H_2O$ and 22.0 g of $Al(NO_3)_3 \cdot 9H_2O$ were dissolved in 2 liters of methanol. A 2M KOH in methanol solution was then added to the mixture over a period of one hour and 15 mins. until the pH was 7.0. The mixture was then vacuum filtered and the filter cake placed in an oven at room temperature and slowly heated to 400° C. and calcined at that temperature for 2 hours. After cooling to room temperature, the catalyst was then ground to a powder and dispersed in 1 liter of distilled water. The catalyst mixture was then vacuum filtered and the filter cake reslurried with 1 liter of distilled water and vacuum filtered again. The catalyst was then placed in an oven at 120° C. and dried overnight. A portion of the catalyst was doped by adding a solution of KOH in water until the level of potassium reached 3 percent. The doped catalyst was then dried in an oven at 120° C. The percent by weight of the metal components based on the total weight of catalyst was:
Cu: 19.0 percent
U: 51.0 percent
Al: 1.2 percent
K: 8.4 percent

(II) Activation/Reduction

The catalyst was pelletized with 3 percent graphite and was reduced in a stream of hydrogen/nitrogen as described above in Preparation A.

EXAMPLES 5 AND 6

The reduced catalyst from Preparation C was employed for the vapor phase decomposition of methanol, the reaction conditions and percent conversions being recorded in Table 1.

PREPARATION D

(I) Preparation of Copper-Zirconium Catalyst

A catalyst of the formula $Cu_{0.84}$ Zr $Mn_{0.34}$ $Pd_{0.09}$ $K_{0.38}$ $O_x$ was prepared as follows: 125 g of $Cu(NO_3)_2 \cdot 2\frac{1}{2}H_2O$, 166 g of $ZrO(NO_3)_2 \cdot xH_2O$, 93 g of $Mn(NO_3)_2$ as a 50 percent solution and 14 g of $Pd(NO_3)_2 \cdot xH_2O$ were dissolved in 2 liters of distilled water and heated to about 90° C. A hot aqueous potassium carbonate solution was added to the mixture over a period of about one hour until the pH reached 9.50. The mixture was then kept at 90° C. for an additional hour and then cooled to room temperature. 2M nitric acid was then added until the pH reached 7.0. The mixture was then vacuum filtered and the filter cake was slurried with one liter of water and heated to near boiling and filtered again. This was repeated a further two times. The catalyst was then dried overnight in an oven at 125° C. and then calcined in an oven at 400° C. for 4 hours.

(II) Reduction/Activation

The catalyst was then reduced exactly as described above in Preparation A.

EXAMPLE 7 AND 8

The reduced catalyst of Preparation D was used for the decomposition of methanol. The conditions and results are recorded in Table 1.

PREPARATION E

(I) Preparation of copper-zinc-aluminum-sodium catalyst

A first solution was prepared by dissolving 18.28 grams of $Na_2Al_2O_4 3H_2O$ in 125 cc of distilled water. 43.75 cc of concentrated $HNO_3$ were added to this solution. A precipitate was formed. The mixture was stirred until the precipitate redissolved. A second solution was prepared by dissolving 209.39 grams of $Cu(NO_3)_2$ $2.5H_2O$ and 134.5 grams of $Zn(NO_3)_2$ $6H_2O$ in one liter of water. The two solutions were mixed and water was added to provide a third solution having a volume of 1.5 liters. The third solution was heated to 85° C. and transferred to a dropping funnel positioned over a four-liter beaker containing 200 cc of water. A 1M $Na_2CO_3$ solution was heated to 85° C. and transferred to a dropping funnel positioned over a four-liter beaker. The third solution was added to the beaker at a rate of 112 cc/min. The $Na_2CO_3$ solution was added at a rate of 120 cc/min. The contents of the beaker were maintained at 85° C. and stirred with a mechanical stirrer during the addition of solutions. The resulting slurry was stirred for one hour at 85° C. The pH of this slurry was 7.06. The slurry was vacuum filtered and a moist filter cake was formed. The filter cake was washed once with one liter of distilled water, dried, and calcined for 6 hours at 300° C.

The Cu:Zn:Al:Na ratio of this calcined catalyst was 1.71:1.0:0.34:0.35.

The percent by weight of the various metal components based on the total weight of the catalyst were:
Cu: 35 percent
Zn: 21 percent
Al: 3 percent
Na: 2.6 percent

(II) Activation/Reduction

The catalyst was reduced as described above in Preparation A.

EXPERIMENTS 4 AND 5

The reduced catalyst of Preparation E was used for the decomposition of methanol. The conditions and results are recorded in Table 2.

TABLE 1

| Example | Catalyst Preparation | Temperature °C. | Space Velocity V/V/hour | Percent Conversion |
|---|---|---|---|---|
| 1 | Cu/Th/Pd/K Preparation A | 220 | 347 | 63 |
| 2 | Cu/Th/Pd/K Preparation A | 200 | 333 | 51 |
| 3 | Cu/Th/Pd Preparation B | 220 | 486 | 74 |
| 4 | Cu/Th/Pd Preparation B | 200 | 466 | 55 |
| 5 | Cu/U/Al/K Preparation C | 220 | 168 | 50 |
| 6 | Cu/U/Al/K Preparation C | 200 | 161 | 34 |
| 7 | Cu/Zr/Mn/Pd/K Preparation D | 220 | 256 | 57 |
| 8 | Cu/Zr/Mn/Pd/K Preparation D | 200 | 245 | 39 |

All the examples were performed at atmospheric pressure.

TABLE 2

| Experiment | Catalyst Preparation | Temperature °C. | Space Velocity V/V/hour | Percent Conversion |
|---|---|---|---|---|
| *1 | Cu/Zn Commercial Catalyst | 232 | 1000 | 4.5 |
| 2 | Cu/Cr/Mn Commercial Catalyst | 220 | 494 | 40 |
| 3 | Cu/Cr/Mn Commercial Catalyst | 200 | 474 | 29 |
| 4 | Cu/Zn/Al/Na Preparation E | 220 | 488 | 31 |
| 5 | Cu/Zn/Al/Na Preparation E | 200 | 468 | 25 |

All the experiments were performed at atmospheric pressure.
*The result in Experiment 1 was reported in U.S. Pat. No. 4,407,238 and is included because, although not strictly comparable to any of the Examples, it does show a very low conversion of methanol using a commercial methanol synthesis catalyst.

The experiments are not according to the invention and are included for comparative purposes only.

Comparison of Examples 3 and 4 with Comparative experiments 4 and 5 respectively, shows that under substantially identical conditions the Cu/Th/Pd catalyst of the invention gives a far higher conversion of methanol than does Cu/Zn/Al/Na catalyst which is a typical prior art methanol synthesis catalyst.

Furthermore, comparison of Examples 3 and 4 with comparative experiments 2 and 3 respectively, shows that under substantially identical conditions (the minor differences in space velocity being insignificant) the Cu/Th/Pd catalyst of the invention gives a far higher conversion of methanol than does the Cu/Cr/Mn commercial catalyst, the use of which is disclosed in U.S. Pat. No. 4,407,238.

We claim:

1. A process for the decomposition of an alcohol to form hydrogen and carbon monoxide which process comprises decomposing the alcohol at elevated temperature in the presence of a catalyst of the formula $$Cu_a L M_b A_c O_x$$

where L is one or more of the metals selected from the group consisting of Th, Be, Zr, Ce, Mg and U; M is one ore more of the metals selected from the group consisting of Ca, Mo, Mn, Ce, Cr, Al, Ti, La, V and Re; A is an alkali metal and where
a is from 0.50 to 2.50,
b is from 0.005 to 1.00,
c is from 0 to 2.0, and
x is a number such that a valence requirement of the other elements for oxygen are satisfied.

2. The process as claimed in claim 1 wherein a is from 1.30 to 1.70, and b is from 0.005 to 0.60.

3. The process as claimed in claim 1 where L is Th.

4. The process as claimed in claim 1 wherein L is U.

5. The process as claimed in claim 4 wherein M is Al.

6. The process as claimed in claim 1 wherein the catalyst is substantially alkali metal free.

7. The process as claimed in claim 1 wherein the catalyst has been partially reduced in a stream of a reducing gas before contacting with the alcohol.

8. The process as claimed in claim 1 wherein the low molecular weight alcohol is a saturated monohydric alcohol containing from 1 to 6 carbon atoms.

9. The process as claimed in claim 8 wherein the monohydric alcohol is methanol or ethanol.

10. The process as claimed in claim 1 wherein the temperature is from about 150° to 300° C. and the pressure from about 0.5 to 3 atmospheres.

11. The process as claimed in claim 1 wherein water, if present, will be less than the stoichiometic amount required for the steam reforming of methanol.

* * * * *